(12) United States Patent
Krautter

(10) Patent No.: US 10,737,674 B2
(45) Date of Patent: Aug. 11, 2020

(54) METHOD AND CONTROL DEVICE FOR OPERATING A VEHICLE BRAKE SYSTEM EQUIPPED WITH AN ELECTROHYDRAULIC BRAKE BOOSTER DEVICE

(71) Applicant: Robert Bosch GmbH, Stuttgart (DE)

(72) Inventor: Andreas Krautter, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 15/471,007

(22) Filed: Mar. 28, 2017

(65) Prior Publication Data

US 2017/0282878 A1 Oct. 5, 2017

(30) Foreign Application Priority Data

Apr. 1, 2016 (DE) .................. 10 2016 205 406

(51) Int. Cl.
*B60T 13/66* (2006.01)
*B60T 13/74* (2006.01)
*B60T 13/16* (2006.01)
*B60T 13/68* (2006.01)

(52) U.S. Cl.
CPC .......... *B60T 13/662* (2013.01); *B60T 13/166* (2013.01); *B60T 13/686* (2013.01); *B60T 13/745* (2013.01)

(58) Field of Classification Search
CPC .... B60T 13/662; B60T 13/166; B60T 13/686; B60T 13/745
See application file for complete search history.

(56) References Cited

U.S. PATENT DOCUMENTS

| | | | | |
|---|---|---|---|---|
| 3,358,097 | A | * | 12/1967 | Kersting ............... B60T 17/226 188/151 A |
| 5,921,084 | A | * | 7/1999 | Gautier ................. B60T 13/573 60/553 |
| 6,460,942 | B1 | * | 10/2002 | Shimizu .................. B60T 7/042 303/11 |
| 2001/0006306 | A1 | * | 7/2001 | Kagawa .................. B60T 8/367 303/20 |
| 2014/0142829 | A1 | * | 5/2014 | Strengert .................. B60T 1/10 701/70 |

FOREIGN PATENT DOCUMENTS

DE 102014208884 A1 11/2015
JP 5105073 A * 4/1993

* cited by examiner

*Primary Examiner* — Melody M Burch
(74) *Attorney, Agent, or Firm* — Norton Rose Fulbright US LLP; Gerard Messina

(57) ABSTRACT

A method for operating a vehicle brake system, including activation of a electrohydraulic brake booster device when there is an actuation of a brake actuating element, so a brake pressure increase is brought about in a wheel brake cylinder, and decoupling of the wheel brake cylinder from a master brake cylinder of the brake system by closing a separating valve, it being ascertained, before the closing of the separating valve, whether a first quantity relating to an actuation speed of the actuation of the brake actuating element and/or a second quantity relating to a master brake cylinder pressure increase is within at least one specified normal value range, and, if warranted, the separating valve being closed without a delay, whereas otherwise the closing of the separating valve is delayed taking into account the second quantity and/or a third quantity relating to the brake pressure increase.

21 Claims, 2 Drawing Sheets

METHOD AND CONTROL DEVICE FOR OPERATING A VEHICLE BRAKE SYSTEM EQUIPPED WITH AN ELECTROHYDRAULIC BRAKE BOOSTER DEVICE

CROSS REFERENCE

The present application claims the benefit under 35 U.S.C. § 119 of German Patent Application No. DE 102016205406.6 filed on Apr. 1, 2016, which is expressly incorporated herein by reference in its entirety.

FIELD

The present invention relates to a method for operating a vehicle brake system equipped with an electrohydraulic brake booster device. The present invention also relates to a control device for a vehicle brake system equipped with an electrohydraulic brake booster device. In addition, the present invention relates to a brake system for a vehicle.

BACKGROUND INFORMATION

German Patent Application NO. DE 10 2014 208 884 A1 describes a brake system for a vehicle, in which each wheel brake cylinder is connected to a master brake cylinder via a respective first separating valve, and each wheel brake cylinder is connected to a motorized piston-cylinder device via a respective second separating valve. After closing of the first separating valves, an increase in brake pressure in all the wheel brake cylinders decoupled from the master brake cylinder is to be capable of being brought about through operation of the motorized piston-cylinder device. Moreover, by actuating a brake pedal connected to the master brake cylinder, a driver of the vehicle is to be given the possibility of braking directly into the wheel brake cylinders coupled to the master brake cylinder, via the open first separating valves.

SUMMARY

The present invention provides a method for operating a vehicle brake system equipped with an electrohydraulic brake booster device, a control device for a vehicle brake system equipped with an electrohydraulic brake booster device, and a brake system for a vehicle.

The present invention provides for using a highly dynamic actuation, performed by a driver, of the driver's brake actuating element for an acceleration of the increase in brake pressure in the at least one wheel brake cylinder of the brake system, even in a brake system equipped with an electrohydraulic brake booster device. In particular in the case of panic braking or hard braking, the driver actuates the brake actuating element with increased actuation speed, and in this way causes a comparatively rapid increase of the master brake cylinder pressure in the master brake cylinder of the brake system, so that the pressure buildup dynamic caused by the driver in the master brake cylinder is often greater than an initial pressure buildup dynamic of the electrohydraulic brake booster device. Through a delayed closing of the at least one separating valve, in this case the present invention brings it about that the more rapidly increased master brake cylinder pressure can contribute to the accelerated increase in brake pressure in the at least one wheel brake cylinder, via the at least one open separating valve. Thus, in particular in the case of a panic braking or hard braking, a vehicle/motor vehicle using the present invention can be brought more rapidly to a standstill.

Electrohydraulic brake booster devices for brake systems are supplied with energy from a vehicle electrical network in order to bring about the desired brake pressure increase in the at least one connected wheel brake cylinder, through operation of the respective electrohydraulic brake booster device. A frequent limitation of the available power of the vehicle electrical network can be circumvented using the present invention in that, in particular in the case of a panic braking or hard braking, the dynamic behavior of the driver when actuating the brake actuating element is used to increase the pressure buildup dynamic of the brake system. Through the delayed closing of the at least one separating valve, in this way a pressure buildup speed can be achieved in the at least one wheel brake cylinder that is greater than a buildup speed of the electrohydraulic brake booster device. Therefore, the present invention also contributes to the circumstance that relatively high pressure buildup speeds can still be achieved in the at least one wheel brake cylinder (in particular when required by the driver) even if the brake system is equipped with an electrohydraulic brake booster device that is comparatively low in cost and/or requires relatively little constructive space and/or energy.

Moreover, the present invention prevents the driver from being given an abnormal brake actuation feeling (pedal feeling) when actuating the brake actuating element due to the delayed closing of the at least one separating valve. Here, the present invention takes into account that the driver will not notice an abnormal brake actuation feeling or an implausible behavior of the brake actuating element until he goes from a highly dynamic actuation to an actuation of the brake actuating element with a low dynamic characteristic. The present invention takes this into account by delaying the closing of the at least one separating valve taking into account the at least one second quantity and/or the at least one third quantity. Thus, even during a panic braking or hard braking, the driver will not perceive any abnormal behavior of the brake actuating element.

In an advantageous specific embodiment of the method, if the at least one first quantity and/or the at least one second quantity are outside the at least one specified normal value range, the closing of the at least one separating valve is delayed until the at least one second quantity falls below at least one specified first threshold value, and/or the at least one third quantity exceeds at least one specified second threshold value. Both conditions ensure that the at least one separating valve is closed as soon as the dynamics of the driver's actuation of the brake actuating element decreases. Beginning from a decrease in the dynamic behavior of the driver in the actuation of the brake actuating element (or from a bringing about of an adequate pressure buildup dynamic via the electrohydraulic brake booster device), it is no longer necessary to hold open the at least one separating valve, so that a decoupling of the at least one wheel brake cylinder from the master brake cylinder is possible without drawbacks.

In an alternative or supplementary specific embodiment of the method, if the at least one first quantity and/or the at least one second quantity are outside the at least one specified normal value range, the closing of the at least one separating valve is delayed until a deviation between the at least one second quantity and the at least one third quantity is within a specified target deviation range. Thus, this specific embodiment of the present invention also realizes a closing of the at least one separating valve at an appropriate time.

Preferably, after the delayed closing of the at least one separating valve, waiting takes place until the brake pressure increase in the at least one wheel brake cylinder decoupled from the master brake cylinder corresponds to a target vehicle deceleration requested via the actuation of the brake actuating element, and subsequently the at least one separating valve is opened for a waited or defined opening time. Via this opening of the at least one separating valve for the waited or defined opening time, the brake fluid that, during the delay of the closing of the at least one separating valve, is shifted from the master brake cylinder via the at least one separating valve to the at least one wheel brake cylinder can be at least partly guided back into the master brake cylinder. This specific embodiment of the method thus contributes to bringing it about that during a static actuation of the brake actuating element, the driver again experiences an ordinary counter-force when pressing the brake actuating element. In particular, the quantity of brake fluid shifted into the master brake cylinder can be such that a position of the brake actuating element again corresponds to a specified driver braking force/brake actuation element position characteristic curve. Thus, there is no risk that the driver will perceive a brake actuating element that is "situated too deeply" due to the brake fluid shifted from the master brake cylinder via the at least one separating valve to the at least one wheel brake cylinder during the delaying of the closing of the at least one separating valve.

For example, the opening time of the at least one separating valve can last until a current position of the brake actuating element corresponds to a specified target relation of a master brake cylinder pressure. Likewise, the opening time of the at least one separating valve can be defined taking into account at least one difference between the master brake cylinder pressure and a brake pressure built up at least partly by the electrohydraulic brake force booster device. Both procedures have the result that after the elapsing of the opening time of the at least one separating valve the driver perceives a normal behavior of the brake actuating element.

The advantages described above are also provided in a control device for a vehicle brake system equipped with an electrohydraulic brake booster device. It is to be noted that the control device can be further developed according to the above-described specific embodiments of the method.

In addition, the brake system also provides the advantages described above for a vehicle having a corresponding control device.

BRIEF DESCRIPTION OF THE DRAWINGS

Further features and advantages of the present invention are described below on the basis of the Figures.

DETAILED DESCRIPTION OF EXAMPLE EMBODIMENTS

Figure 1:
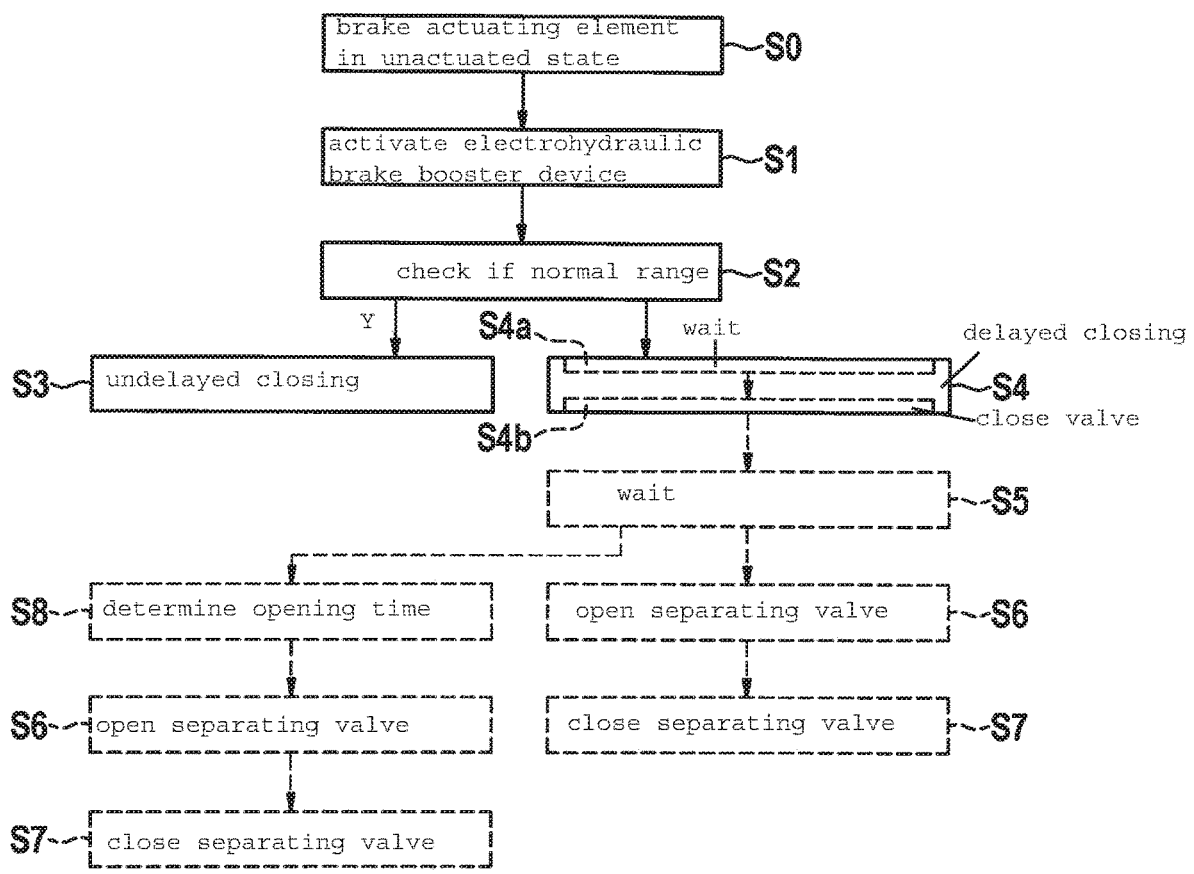
FIG. 1 shows a functional diagram for the explanation of a specific embodiment of the method for operating a vehicle brake system equipped with an electrohydraulic brake booster device.

FIG. 1 shows a functional diagram for the explanation of a specific embodiment of the method for operating a vehicle brake system equipped with an electrohydraulic brake booster device.

The method described below may be realized with a large number of different brake systems each equipped with an electrohydraulic brake booster device. The electrohydraulic brake booster device can be understood for example as at least one pump and/or at least one motorized piston-cylinder device (or a plunger device). In particular, the electrohydraulic brake booster device can be understood as a brake booster device situated downstream from a master brake cylinder of the respective brake system, by which at least one brake pressure in at least one wheel brake cylinder of the respective brake system can be increased even after a decoupling of the master brake cylinder from the at least one wheel brake cylinder by closing at least one separating valve. The electrohydraulic brake booster device can also be designated an integrated brake booster device (IPB, Integrated Power Brake). It is explicitly indicated that the realization of the method described below is limited neither to a particular type of electrohydraulic brake booster device nor to a particular brake system type, or to a particular vehicle type/motor vehicle type.

The method starts from an initial state S0, in which a brake actuating element is present, unactuated, in the respective vehicle. Method step S1 begins from an actuation of the brake actuating element by a driver of the vehicle. However, in all method steps described below the brake system returns to initial state S0 as soon as the driver terminates the actuation of the brake actuating element.

In method step S1, the electrohydraulic brake booster device is activated in such a way that an increase in brake pressure is brought about in the at least one wheel brake cylinder of the brake system (at least partly) by the electrohydraulic brake booster device. For example, brake fluid thereupon begins to be transferred, by the electrohydraulic brake booster device, into the at least one wheel brake cylinder in order in this way to increase the at least one brake pressure in the at least one wheel brake cylinder in accordance with the driver's desired braking, indicated by the driver through the actuation of the brake actuating element.

Simultaneously with method step S1, or shortly before or after method step S1, a method step S2 is also carried out. Preferably, method step S2 is started beginning with the recognition of the actuation of the brake actuating element by the driver of the vehicle. In method step S2, it is ascertained whether at least one quantity relating to a speed of the actuation of the brake actuating element and/or at least one second quantity relating to a master brake cylinder pressure increase in the master brake cylinder of the brake system caused by the actuation of the actuating element is within at least one specified normal value range. Preferably, the at least one normal value range is specified such that the at least one first quantity and/or the at least one second quantity are outside the at least one normal value range in the case of a highly dynamic actuation of the brake actuating element by the driver, such as a panic braking or a hard braking.

The at least one first quantity can be for example a pedal speed of a brake actuating element fashioned as a brake pedal. (However, the realization of the method described here is not limited to a "pedal shape" of the brake actuating element.) In particular, a pedal path sensor and/or a rod path sensor can be used to ascertain the at least one quantity. As the at least one normal value range, for example a speed threshold can be specified that is exceeded by the actuation speed when there is a highly dynamic actuation of the brake actuating element. As the at least one second quantity, the master brake cylinder pressure increase and/or an absolute value of the master brake cylinder pressure (within a specified time interval after the beginning of the actuation of the brake actuating element by the driver) can be evaluated. In order to ascertain the at least one second quantity, for example a pre-pressure sensor and/or a master brake cylinder pressure sensor can be used. As the at least one normal value range, in particular at least one boundary value for the master brake cylinder pressure increase and/or the absolute value of the master brake cylinder pressure can be specified that is exceeded when there is a highly dynamic actuation of the brake actuating element.

If in method step S2 it is determined that the at least one first quantity and/or the at least one second quantity are within the at least one specified normal value range, then in a method step S3 the at least one wheel brake cylinder of the brake system is decoupled from the master brake cylinder through undelayed closing of at least one separating valve. This closing of the at least one separating valve (almost) immediately after the determination of the actuation of the brake actuating element by the driver brings it about that the driver, decoupled from the at least one wheel brake cylinder, has for this case a brake actuation feeling (or pedal feeling) that is realized at the brake system via the design (e.g. by a simulator connected to the master brake cylinder). While the driver for example can easily actuate the brake actuating element, the electrohydraulic brake booster device can bring about a brake pressure increase in the at least one wheel brake cylinder that the driver could not bring about with an application of force comparable to his braking action.

If, however, in method step S2 it is determined that the at least one first quantity and/or the at least one second quantity are outside the at least one specified normal value range, then the method is continued with a method step S4 in which the closing of the at least one separating valve is delayed. The delaying of the closing of the at least one separating valve preferably takes place until a pressure buildup dynamic of the electrohydraulic brake booster device is at least as great as a pressure buildup dynamic brought about by the driver through the actuation of the brake actuating element. In order to ensure this, in method step S4 the delayed closing of the at least one separating valve takes place, taking into account the at least one second quantity and/or at least one third quantity relating to the brake pressure increase brought about by the electrohydraulic brake booster device. Thus, in particular in the case of a highly dynamic actuation of the brake actuating element by the driver, the highly dynamic braking of the driver into the master brake cylinder can be used to increase the brake pressure in the at least one wheel brake cylinder until it can be recognized that, on the basis of the pressure buildup dynamic of the electrohydraulic brake booster device, which is stronger compared to the pressure buildup dynamic brought about by the driver, the pressure buildup dynamic brought about by the driver can be done without drawback.

As the at least one third quantity, the brake pressure increase brought about by the electrohydraulic brake booster device, and/or an absolute value of the brake pressure (in the at least one wheel brake cylinder) built up by the electrohydraulic brake booster device, can be evaluated. In order to ascertain the at least one third quantity, for example a pressure sensor connected to the electrohydraulic brake booster device and/or a circular pressure sensor can be used.

For example, the closing of the at least one separating valve in method step S4 can be delayed until the at least one second quantity falls below at least one specified first threshold value and/or the at least one third quantity exceeds at least one specified second threshold value. Thus, in a method step S4a, waiting can for example take place until the master brake cylinder pressure increase falls below the first threshold value, the brake pressure increase brought about by the electrohydraulic brake booster device exceeds the at least one second threshold value, and/or the brake pressure built up by the electrohydraulic brake booster device exceeds the at least one second threshold value. Alternatively or in addition, in method step S4 the closing of the at least one separating valve can also be delayed until a deviation between the at least one second quantity and the at least one third quantity is within a specified target deviation range. In particular, in method step S4a waiting can take place until the brake pressure built up by the electrohydraulic brake booster device is greater than the master brake cylinder pressure by a specified target deviation, or is equal to the master brake cylinder pressure. If the specified condition is present, then in a method step S4b the at least one separating valve is (immediately) closed, so that the driver is decoupled from the at least one wheel brake cylinder of the brake system. The driver thus does not perceive the operation of the electrohydraulic brake booster device during his further actuation of the brake actuating element.

A volume of brake fluid shifted from the master brake cylinder via the at least one separating valve to the at least one wheel brake cylinder during the delaying of the closing of the at least one separating valve (i.e. during method step S4a) is designated below as "dynamic pressure buildup volume." The shifting of the "dynamic pressure buildup volume" frequently results in a position of the brake actuating element that deviates from a standard driver's braking force/brake actuation element position characteristic curve. Here, one speaks also of a "deeper" brake actuating element than is the case given an undelayed closing of the at least one separating valve. However, as a rule the driver will not notice any difference, at least in the short term, given a highly dynamic actuation of the brake actuating element.

Preferably, after method step S4 the method continues with an (optional) method step S5. In method step S5, after the (delayed) closing of the at least one separating valve, waiting takes place until the brake pressure increase in the at least one wheel brake cylinder decoupled from the master brake cylinder corresponds to a target vehicle deceleration requested by the actuation of the brake actuating element. Subsequently, in an (optional) method step S6 the at least one separating valve is opened for a waited or defined opening time. Preferably, the opening of the at least one separating valve takes place until the "dynamic pressure buildup volume" (i.e. the brake fluid volume shifted during the delaying of the closing of the at least one separating valve" is again shifted into the master brake cylinder. The position of the brake actuating element, deviating from the standard driver's braking force/brake actuating element position characteristic curve due to the delayed closing of the at least one separating valve, can thus again be timely compensated. This timely compensation of the position of the brake actuating element ensures that the driver is not given any modified brake actuation feeling, despite the delayed closing of the at least one separating valve. In particular, in this way the driver will not experience a "deeper" brake actuating element. After the elapsing of the waited or defined opening time, the at least one separating valve is closed again in an (optional) method step S7.

For example, in method step S6 the opening time of the at least one separating valve can be waited until a current position s of the brake actuating element corresponds to a specified target relation of the master brake cylinder pressure. According to the equation (Eq. 1), a target position $s_0$ of the brake actuating element, given a current master brake cylinder pressure $p_{TMC}$, is derivable as:

$$s_0 = f(p_{TMC}) \quad \text{(Eq. 1)}$$

The target relation $f(p_{TMC})$ can also be described as a brake actuation feeling characteristic curve (or a pedal feeling characteristic curve). In order to ascertain the current position s of the brake actuating element, for example a pedal path sensor and/or a rod path sensor can be used.

Preferably, however, before method step S6 another method step S8 is carried out in which opening time T of the at least one separating valve is defined taking into account at least one difference between the current master brake cylinder pressure $p_{TMC}$ and the brake pressure $p_{IPB}$ built up by the electrohydraulic brake booster device. (The opening time T can also be designated a control duration of, and/or duration of the supply of current to, the at least one separating valve.)

In particular, opening time T of the at least one separating valve can be defined via a so-called Bernoulli equation. For this purpose, first a correction volume $V_c$ (corresponding to the "dynamic pressure buildup volume") that is to be shifted into the master brake cylinder within opening time T by the opening of the at least one separating valve is calculated. According to the equation (Eq. 2), this takes place as:

$$V_c = A_{TMC} * \frac{s - s_0}{k_p} \quad \text{(Eq. 2)}$$

where $A_{TMC}$ is a piston surface of the master brake cylinder, s is the current position of the brake actuating element, $s_0$ is the target position of the brake actuating element, and $k_p$ is a fixedly defined translation (pedal translation). (If the path sensor system is situated on a piston rod, the translation/pedal translation plays no role, and only the differences are taken into account.)

The Bernoulli equation yields a prediction of the volume flow Q through the at least one open separating valve, according to the equation (Eq. 3):

$$Q = k_v \sqrt{p_{IPB} - p_{TMC}} \quad \text{(Eq. 3)}$$

where $P_{TMC}$ is the current master brake cylinder pressure, $P_{IPB}$ is the brake pressure built up by the electrohydraulic brake boosting, and kv is a valve characteristic value. In this way, according to the equation (Eq. 4) the opening time T of the at least one separating valve results as:

$$T = \frac{V_c}{Q} \quad \text{(Eq. 4)}$$

Through the calculation of opening time T, the closing time/transition time can be calculated ahead of time. This is helpful above all if the opening time T required for the position correction has a smaller temporal resolution than does a query of the condition whether the brake actuating element has arrived at its target position $s_0$. The calculation ahead of time of method step S8 is also appropriate for the suppression of a possible overshooting.

In the case of a separating valve designed as a $\Delta p$ regulating valve, a pressure regulation can also be used to correct the position of the brake actuating element. For this purpose, the supply of current to the respective separating valve is selected such that the pressure difference at the separating valve arises so as to be in accordance with a prespecified characteristic curve for the vehicle deceleration that is carried out. In this way as well, a simple and reliable correction of the position of brake actuating element can be carried out until its current position corresponds to the executed vehicle deceleration.

Figure 2:
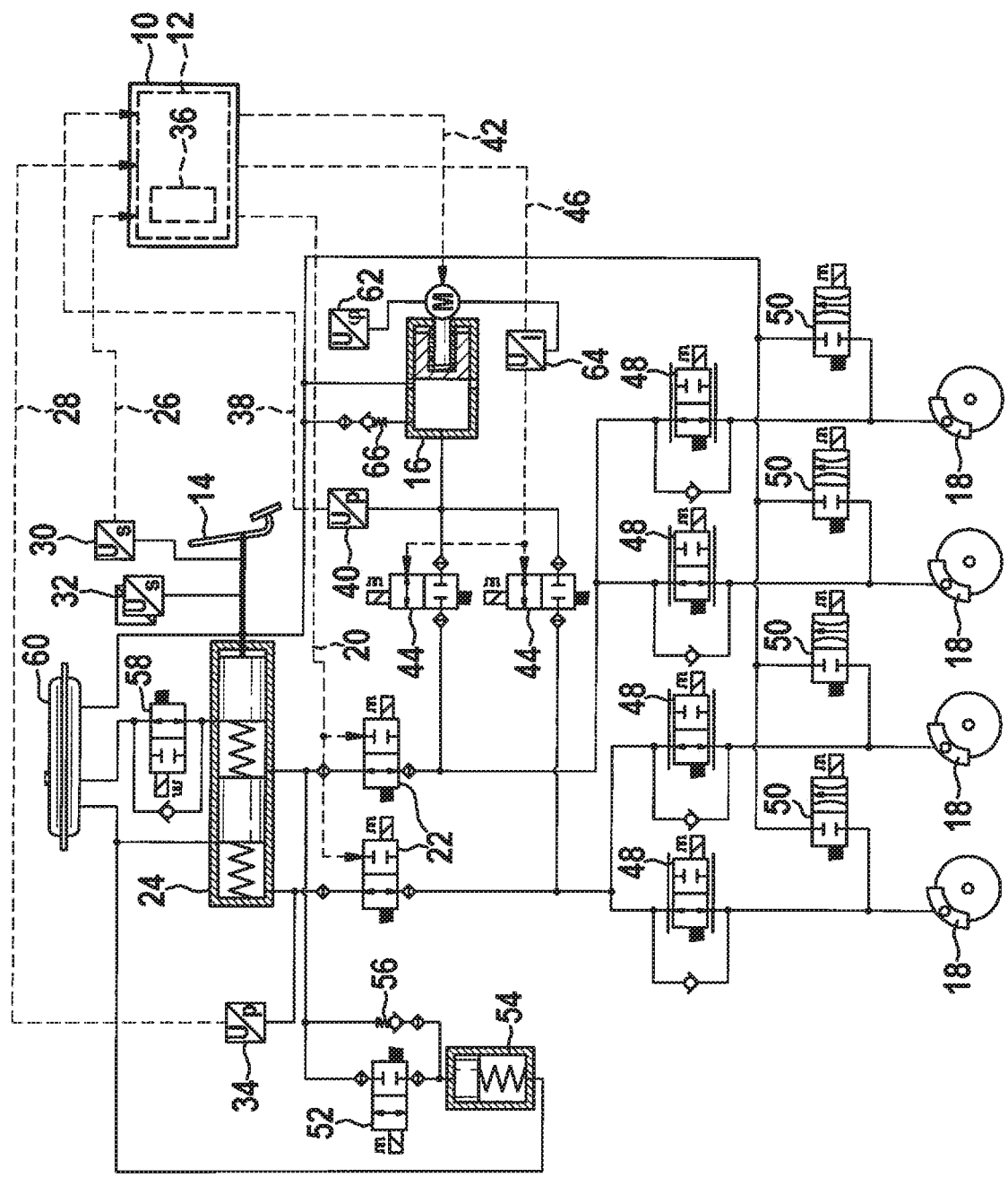
FIG. 2 shows a schematic representation of a specific embodiment of the control device, or of a vehicle brake system equipped with the control device and with an electrohydraulic brake booster device.

FIG. 2 shows a schematic representation of a specific embodiment of the control device, or of a vehicle brake system equipped therewith and having an electrohydraulic brake booster device.

However, it is to be noted that the further statements concerning the brake system of FIG. 2, equipped with control device 10, are to be interpreted only as examples. The use of control device 10 is not limited to a particular brake system type or vehicle type/motor vehicle type of the vehicle/motor vehicle equipped therewith.

Control device 10 has a control electronics 12 by which at least one closing signal 20 can be outputted to at least one separating valve 22 of the brake system during an actuation of a brake actuating element 14 by a driver of the vehicle/motor vehicle equipped with the brake system, and during a corresponding brake pressure increase brought about (at least partly) by the electrohydraulic brake booster device 16 in at least one wheel brake cylinder 18 of the brake system. The at least one separating valve 22 is to be understood as at least one valve via which the at least one wheel brake cylinder 18 is hydraulically connected to a master brake cylinder 24 of the brake system. An output of the at least one closing signal 20 to the at least one separating valve 22 by control electronics 12 thus brings it about that the at least one separating valve 22 is controlled into its closed state, whereby the at least one wheel brake cylinder 18 can be/is decoupled from master brake cylinder 24.

Moreover, control electronics 12 is designed to ascertain, before the outputting of the at least one closing signal 20, whether at least one ascertained or received first quantity 26 relating to an actuation speed of the actuation of brake actuating element 14 and/or at least one ascertained or received second quantity 28 relating to a master brake cylinder pressure increase, brought about by the actuation of brake actuating element 14, in master brake cylinder 24 is within at least one specified normal value range. To ascertain the at least one first quantity 26, for example a pedal path sensor 30 and/or a rod path sensor 32 can be used. To ascertain the at least one second quantity 28, e.g. a pre-pressure sensor 34 and a master brake cylinder pressure sensor can be used. The at least one specified normal value range can be stored on a storage unit 36 of control device 10.

If the at least one first quantity 26 and/or the at least one second quantity 28 24 are within the at least one specified normal value range, then control electronics 12 is designed to output the at least one closing signal 20 without a delay. Otherwise, control electronics 12 is designed to delay the outputting of the at least one closing signal 20 taking into account the at least one second quantity 28 and/or at least one ascertained or received third quantity 38 relating to the brake pressure increase brought about (at least partly) by electrohydraulic brake booster device 16. To ascertain the at least one third quantity 38, for example a pressure sensor 40 and/or a circular pressure sensor connected to electrohydraulic brake booster device 16 can be used.

In this way, control device 10 also provides the advantages described above, whose description is not repeated here. The criterion as to when a high actuation dynamic or a low actuation dynamic is present in the actuation of brake actuating element 14 can be derived using parameters stored in storage unit 36.

Electrohydraulic brake booster device 16 can be understood as any hydraulic device by whose operation the brake pressure increase can be (at least partly) brought about in the at least one wheel brake cylinder 18 decoupled from master brake cylinder 24 by closing the at least one separating valve 22. Purely as an example, in the brake system of FIG. 2 electrohydraulic brake booster device 16 is a motorized piston-cylinder device (or a plunger device). Likewise, electrohydraulic brake booster device 16 can also include at least one pump. As an advantageous development, control electronics 12 can in addition be designed to determine, taking into account the actuation of brake actuating element 14, at least one target brake pressure for the at least one wheel brake cylinder 18 that can be decoupled from master brake cylinder 24 by closing the at least one separating valve 22. Subsequently, control electronics 12 can be designed to control electrohydraulic brake booster device 16 using at least one control signal 42 in such a way that a brake pressure corresponding to the respective target brake pressure can be/is built up in the at least one wheel brake cylinder 18 decoupled from master brake cylinder 24.

At least one further separating valve 44, via which the at least one wheel brake cylinder 18 is connected to electrohydraulic brake booster device 16, can also be capable of being controlled via at least one signal 46 outputted by control electronics 12. Likewise, control electronics 12 can be designed to control at least one wheel inlet valve 48, at least one wheel outlet valve 50, a simulator valve 52 for connecting a simulator 54 to master brake cylinder 24 (having a check valve 56 configured parallel to simulator valve 52), and/or at least one reservoir valve 58 for connecting a brake fluid reservoir 60 to master brake cylinder 24. Moreover, a multiplicity of sensors, such as a rotational rate sensor 62 and/or a motor current sensor 64 of the motorized piston-cylinder device (connected to brake fluid reservoir 60 via a further check valve 66), can be readable by control electronics 12. Due to the multifunctionality of control device 10, in this way additional electronics components in the brake system can be saved.

Control electronics 12 is preferably also designed to wait after the (delayed) output of the at least one closing signal 20 until the at least one brake pressure in the at least one wheel brake cylinder 18 decoupled from master brake cylinder 24 corresponds to a target vehicle deceleration requested via the actuation of brake actuating element 14. Subsequently, control electronics 12 can control the at least one separating valve 22 in its open state for a waited or defined opening time. In this way, a correction of the position of brake actuating element 14 during the transition from a high actuation dynamic to a low actuation dynamic can also be carried out by control device 10. Further method steps of the method described above can also be carried out by control electronics 12.

What is claimed is:

1. A method for operating a vehicle brake system equipped with an electrohydraulic brake booster device, the method comprising:
    detecting an actuation of a brake actuating element by a driver of the vehicle;
    responsive to the actuation of the brake actuating element, activating the electrohydraulic brake booster device to increase a brake pressure in at least one wheel brake cylinder of the brake system;
    responsive to the detecting of the actuation of the brake actuating element, comparing an actuation speed or force of the actuation of the brake actuating element to a predefined first threshold value, thereby determining that the actuation speed or force is greater than the first threshold value; and
    responsive to the determining that the actuation speed or force is greater than the first threshold value:
        waiting for passage of a delay time period during which a master brake cylinder is coupled to, and increases the brake pressure in, the at least one wheel brake cylinder; and
        responsive to the passage of the delay time period, decoupling the at least one wheel brake cylinder from the master brake cylinder by closing at least one separating valve.

2. The method as recited in claim 1, wherein the delay time period is until at least one of: i) a pressure of the master brake cylinder falls below a second threshold value, and ii) a quantity corresponding to the increase of the brake pressure in the at least one wheel brake cylinder caused by the electrohydraulic brake booster device exceeds a third threshold value.

3. The method as recited in claim 1, wherein the delay time period is until a deviation between a pressure of the master brake cylinder and a quantity corresponding to the increase of the brake pressure in the at least one wheel brake cylinder caused by the electrohydraulic brake booster device is within a specified target deviation range.

4. The method as recited in claim 1, further comprising:
    waiting after the delayed closing of the at least one separating valve until the brake pressure increase in the at least one wheel brake cylinder decoupled from the master brake cylinder corresponds to a target vehicle deceleration requested via the actuation of the brake actuating element, and subsequently opening the at least one separating valve for a waited or defined opening time.

5. The method as recited in claim 4, wherein the waited opening time of the at least one separating valve lasts until a current position of the brake actuating element corresponds to a specified target relation of a master brake cylinder pressure.

6. The method as recited in claim 4, wherein the opening time of the at least one separating valve is defined taking into account at least one difference between the master brake cylinder pressure and a brake pressure built up at least partly by the electrohydraulic brake booster device.

7. A control device of a vehicle brake system equipped with an electrohydraulic brake booster device, the control device comprising:
    control electronics configured to:
        ascertain whether an actuation speed or force of an actuation of a brake actuating element by a driver of the vehicle, for which a corresponding brake pressure increase is brought about at least partly by the electrohydraulic brake booster device in at least one wheel brake cylinder of the brake system, is greater than a first threshold value;
        if a result of the ascertainment is that the actuation speed or force is not greater than the first threshold value, immediately output at least one closing signal to at least one separating valve of the brake system, causing the at least one separating valve to close and thereby decouple the at least one wheel brake cylinder from a master brake cylinder without a delay; and
        if the result of the ascertaining is that the actuation speed or force is greater than the first threshold value, output the at least one closing signal to the at least one separating valve to close and thereby decouple the at least one wheel brake cylinder from the master brake cylinder after the delay.

8. The control device as recited in claim 7, wherein the control electronics is designed to determine, taking into account the actuation of the brake actuating element, at least one target brake pressure for the at least one wheel brake cylinder that can be decoupled from the master brake cylinder by closing the at least one separating valve, and to control the electrohydraulic brake booster device using at least one control signal in such a way that a brake pressure corresponding to the respective target brake pressure can be built up in the at least one wheel brake cylinder decoupled from the master brake cylinder.

9. The control device as recited in claim 7, wherein the control electronics is designed to wait, after the delayed output of the at least one closing signal, until the brake pressure in the at least one wheel brake cylinder decoupled from the master brake cylinder corresponds to a target vehicle deceleration requested via the actuation of the brake actuating element, and to subsequently control the at least one separating valve into its open state for a waited or defined opening time.

10. A brake system for a vehicle, comprising:
a control device of a vehicle brake system equipped with an electrohydraulic brake booster device, the control device including control electronics configured to:
ascertain whether an actuation speed or force of an actuation of a brake actuating element by a driver of the vehicle, for which a corresponding brake pressure increase is brought about at least partly by the electrohydraulic brake booster device in at least one wheel brake cylinder of the brake system, is greater than a first threshold value;
if a result of the ascertainment is that the actuation speed or force is not greater than the first threshold value, immediately output at least one closing signal to at least one separating valve of the brake system, causing the at least one separating valve to close and thereby decouple the at least one wheel brake cylinder from a master brake cylinder without a delay; and
if the result of the ascertaining is that the actuation speed or force is greater than the first threshold value, output the at least one closing signal to the at least one separating valve to close and thereby decouple the at least one wheel brake cylinder from the master brake cylinder after the delay.

11. A method for operating a vehicle brake system equipped with an electrohydraulic brake booster device, the method comprising:
responsive to an actuation of a brake actuating element by a driver of the vehicle:
activating the electrohydraulic brake booster device to increase a brake pressure in at least one wheel brake cylinder of the brake system;
ascertaining whether at least one of: (i) at least one first quantity relating to an actuation speed of the actuation of the brake actuating element and (ii) at least one second quantity relating to a master brake cylinder pressure in a master brake cylinder of the brake system or an increase of the master brake cylinder pressure brought about by the actuation of the brake actuating element is within at least one predefined normal value range; and
decoupling the at least one wheel brake cylinder from the master brake cylinder by closing at least one separating valve in a manner that is dependent on a result of the ascertaining, such that:
if the result of the ascertaining is that the at least one of the at least one first quantity and the at least one second quantity is within the at least one predefined normal value range, the closing of the at least one separating valve is performed without a delay; and
if the result of the ascertaining is that the at least one of the at least one first quantity and the at least one second quantity is not within the at least one predefined normal value range, the closing of the at least one separating valve is performed after the delay;
wherein at least one of:
the delay is until a deviation between at least one third quantity and the at least one second quantity is within a predefined target deviation range, the at least one third quantity relating to the increase of the brake pressure in the at least one wheel brake cylinder caused by the activation of the electrohydraulic brake booster device; and
the method further comprises, after the closing of the at least one separating valve:
reopening the at least one separating valve; and
subsequently reclosing the at least one separating value in response to the brake actuating element reaching a target position that is a function of the master brake cylinder pressure.

12. The method as recited in claim 11, wherein the delay is until the deviation between the at least one third quantity and the at least one second quantity is within the predefined target deviation range, the at least one third quantity relating to the increase of the brake pressure in the at least one wheel brake cylinder caused by the activation of the electrohydraulic brake booster device.

13. The method as recited in claim 12, wherein the delay is until the increase of the brake pressure in the at least one wheel brake cylinder caused by the activation of the electrohydraulic brake booster device is at least as great as the master brake cylinder pressure.

14. The method as recited in claim 11, wherein the method further comprises, after the closing of the at least one separating valve:
the reopening of the at least one separating valve; and
subsequently, the reclosing of the at least one separating value in response to the brake actuating element reaching the target position.

15. The method as recited in claim 14, wherein the delay is until satisfaction of a condition based on at least one of the at least one second quantity and the at least one third quantity.

16. The method as recited in claim 14, wherein the reopening is performed in response to reaching a target vehicle deceleration requested by the actuation of the brake actuating element.

17. The method as recited in claim 14, wherein the reopening is performed in response to obtaining an indication that a target vehicle deceleration, requested by the actuation of the brake actuating element, has been reached.

18. A method for operating a vehicle brake system equipped with an electrohydraulic brake booster device, the method comprising:
responsive to an actuation of a brake actuating element by a driver of the vehicle:

activating the electrohydraulic brake booster device to increase a brake pressure in at least one wheel brake cylinder of the brake system;

comparing an actuation speed or force of the actuation of the brake actuating element to a predefined non-zero first threshold value, thereby determining that the actuation speed or force is greater than the first threshold value; and responsive to the determining that the actuation speed or force is greater than the first threshold value:

waiting for passage of a delay time period during which a master brake cylinder is coupled to, and increases the brake pressure in, the at least one wheel brake cylinder; and responsive to the passage of the delay time period, decoupling the at least one wheel brake cylinder from the master brake cylinder by closing at least one separating valve.

19. The method as recited in claim 18, wherein the delay time period is until at least one of: i) a pressure of the master brake cylinder falls below a second threshold value, and ii) a quantity corresponding to the increase of the brake pressure in the at least one wheel brake cylinder caused by the electrohydraulic brake booster device exceeds a third threshold value.

20. The method as recited in claim 18, further comprising:

waiting after the delayed closing of the at least one separating valve until the brake pressure increase in the at least one wheel brake cylinder decoupled from the master brake cylinder corresponds to a target vehicle deceleration requested via the actuation of the brake actuating element, and subsequently opening the at least one separating valve for a waited or defined opening time.

21. The method as recited in claim 20, wherein the opening time of the at least one separating valve is defined taking into account at least one difference between the master brake cylinder pressure and a brake pressure built up at least partly by the electrohydraulic brake booster device.

* * * * *